UNITED STATES PATENT OFFICE.

EMERSON H. STRICKLER, OF NEW YORK, N. Y., ASSIGNOR TO GENERAL CHEMICAL COMPANY, OF NEW YORK, N. Y., A CORPORATION OF NEW YORK.

EFFERVESCENT COMPOUND.

1,150,901.   Specification of Letters Patent.   Patented Aug. 24, 1915.

No Drawing. Original application filed February 29, 1912, Serial No. 680,723. Divided and this application filed July 25, 1912. Serial No. 711,408.

*To all whom it may concern:*

Be it known that I, EMERSON H. STRICKLER, a citizen of the United States, and resident of the borough of Manhattan, city, county, and State of New York, have invented certain new and useful Improvements in Effervescent Compounds, of which the following is a specification.

The object of the present invention is to render effervescent compounds, including baking powders, more stable, *i. e.*, less prone to change, by providing the alkali constituent or ingredients thereof which is usually sodium bicarbonate with a coating of an efflorescent compound such as disodium phosphate.

The use of mono-sodium phosphate as the acid constituent of effervescent compounds, the stabilizing of such acid constituent and the stabilizing of a crystallizable salt by means of starch form the subject matter of my application, Serial Number 680,723, filed February 29, 1912, of which the present application is a division.

Of course, my invention is not limited to baking powder, which is here considered an effervescent salt, containing a diluent such as starch, but may be used wherever the substances above referred to may profitably be employed in a more stable condition than heretofore.

In the effervescent compounds of my invention, I may employ an alkali constituent, stabilized in the manner hereinafter described, with any suitable acid constituent stablized or not stabilized, and as such acid constituent, I may use the salt, such as mono-sodium phosphate, stabilized as set forth in the above mentioned application. If baking powder is desired to be made, I may, of course, add the usual diluent of starch.

In the following examples, I give an illustrative method for carrying out my invention. These methods may, of course, be varied within wide limits without departing from the spirit of my invention as set forth in the appended claims.

*Non-hygroscopic and granular sodium bicarbonate.*—Thoroughly wet sodium bicarbonate with a saturated solution of disodium phosphate whose temperature should not be above 110° F.; immediately remove the excess liquor by the suitable use of a pressure filter or of a centrifugal machine; when the removal has been effected, dry the residue at a temperature of preferably not above 90° F.; the product when properly prepared ought to contain about 3% disodium phosphate and about 97% sodium bicarbonate.

The product of the above process may be used as alkali ingredient of an effervescent salt, which may be made by mixing together, for example, 31.5 parts of sodium bicarbonate prepared as described above and 68.5 parts cream tartar. If it is desired to prepare a baking powder, a diluent such as starch is added to such effervescent salt, the amount of diluent being governed by the legal requirement that a baking powder shall have a certain minimum strength.

The material should be preferably so granulated as to pass a 100 mesh screen and remain on a 200 mesh screen, or coarser, if conditions seem to require it.

I claim:

1. As a new article of manufacture sodium bicarbonate stabilized by means of an efflorescent salt.

2. As a new article of manufacture sodium bicarbonate stabilized by means of di-sodium phosphate.

3. As a new article of manufacture an effervescent salt containing an alkali ingredient and an efflorescent salt as stabilizing agent.

4. As a new article of manufacture an effervescent salt containing an alkali ingredient and di-sodium phosphate as stabilizing agent.

5. As a new article of manufacture an effervescent salt containing as an alkali ingredient sodium bicarbonate and an efflorescent salt as stabilizing agent.

6. As a new articles of manufacture an effervescent salt containing as an alkali ingredient sodium bicarbonate and di-sodium phosphate as stabilizing agent.

7. Process of stabilizing a salt which consists in treating the salt with a saturated solution of an efflorescent salt, removing the excess liquor, and drying the product at a temperature below the fusing or decomposing point of the salt being stabilized.

8. Process of stabilizing a salt which consists in treating the salt with a saturated solution of di-sodium phosphate, removing the excess liquor and drying the product at a gradually increasing temperature but below that at which the salt being stabilized begins to fuse or decompose.

9. Process of stabilizing sodium bicarbonate which consists in treating it with a saturated solution of di-sodium phosphate, removing the excess liquor and drying the product at a temperature below that at which the sodium bicarbonate begins to lose carbonic acid.

In testimony whereof I have hereunto set my hand in the presence of two subscribing witnesses.

EMERSON H. STRICKLER.

Witnesses:
  H. W. HILLYER,
  JOHN A. FERGUSON.